United States Patent [19]

Lubelski et al.

[11] Patent Number: 4,713,359

[45] Date of Patent: Dec. 15, 1987

[54] INFRARED ABSORBING GLASS COMPOSITIONS

[75] Inventors: Daniel P. Lubelski, Rossford; Rodney G. Baker, Toledo, both of Ohio

[73] Assignee: Libbey-Owens-Ford Co., Toledo, Ohio

[21] Appl. No.: 851,588

[22] Filed: Apr. 14, 1986

[51] Int. Cl.[4] ............................................. C03C 3/078
[52] U.S. Cl. ...................................... 501/63; 501/70; 501/904; 65/33
[58] Field of Search ...................... 501/63, 904, 69, 70

[56] References Cited

U.S. PATENT DOCUMENTS

| | | | |
|---|---|---|---|
| 2,755,212 | 7/1956 | Brown | 501/904 |
| 3,779,733 | 12/1983 | Janakirama-Rao | 501/70 |

FOREIGN PATENT DOCUMENTS

| | | | |
|---|---|---|---|
| 0547399 | 2/1977 | U.S.S.R. | 501/63 |
| 0823326 | 4/1981 | U.S.S.R. | 501/63 |

*Primary Examiner*—Jacqueline V. Howard
*Attorney, Agent, or Firm*—Marshall & Melhorn

[57] ABSTRACT

A soda-lime-silica glass composition containing $P_2O_5$ for forming glass articles, the composition absorbing infrared radiation and having an Illuminant A (red end and blue end of the spectrum) transmittance of about 70 percent or more.

7 Claims, No Drawings

INFRARED ABSORBING GLASS COMPOSITIONS

The present invention is directed to infrared radiation absorbing soda-lime-silica glass compositions containing $P_2O_5$, and to methods of making the compositions and forming glass articles, therefrom.

BACKGROUND OF THE INVENTION

In the manufacture of infrared radiation absorbing soda-lime-silica glass compositions for use in making glass articles for automotive and architectural applications, iron has been used. The iron is in the form of ferrous ions and ferric ions in the glass made under ordinary melting conditions.

In Janakirama-Rao U.S. Pat. No. 3,779,733 glass articles are formed from soda-lime-silica glass compositions in which at least 80 percent of the total iron in the glass is in the ferrous state. The patent states that the glass articles have a light transmission of greater than 70 percent at 0.25 inch thickness between wavelengths of 350 to 500 millimicrons (blue light). Both iron and tin are incorporated in the soda-lime-silica glasses, the glass composition of Example 1 being as follows:

| Component | Percent by Weight |
|---|---|
| $SiO_2$ | 71.0 |
| $Na_2O$ | 13.5 |
| CaO | 8.5 |
| MgO | 3.8 |
| $Al_2O_3$ | 0.2 |
| $SnO_2$ | 2.5 |
| Iron | 0.5 |
| $SO_3^{--}$ | 0.2 |
| $Cl^-$ | 0.1 |

The iron content was reported as follows:

| Component | Percent by Weight |
|---|---|
| $Fe_2O_3$ | 0.01 |
| FeO | 0.21 |

The U.S. Pat. No. 3,779,733 further states that at least a part of the tin used be in the form of metallic tin to provide stannous ions upon the melting of the glass batch, the molar ratio of stannous ions to ferrous ions in the glass article being at least about 1:1. The stannous ions are said to act as an internal reducing agent.

The above described glass having ferrous ions does have infrared radiation absorbing properties, having a strong absorption band centered at 1060 nanometers. However, in order to obtain sufficient infrared absorption, high iron levels must be used which in turn undesirably decreases Illuminant A values below about 70 percent, which, for example, is too low to meet the Federal Illuminant A requirements of at least about 70 percent for automotive windshield glass. As is known, the Illuminant A value includes transmittance on the red end as well as the blue end of the spectrum.

The above described U.S. Pat. No. 3,779,733 glass can generally pass the Illuminant C test, which concerns transmittance in the blue end of the spectrum.

OBJECTS OF THE INVENTION

It is an object of the present invention to provide an infrared radiation absorbing glass composition for forming glass articles therefrom, the articles also having an Illuminant A transmittance value of at least about 70 percent, good Illuminant C (blue end) transmittance, relatively low total solar transmittance values, and hence, high infrared absorbing capabilities.

It is an object of the present invention to provide an infrared radiation absorbing soda-lime-silica glass composition containing $P_2O_5$, and glass articles from the composition, the resultant glass having an Illuminant A value of at least 70 percent or more.

These and other objects will be apparent from the description that follows and the appended claims.

SUMMARY OF THE INVENTION

The present invention provides an infrared radiation absorbing glass composition that has a high Illuminant C transmittance (blue end of the spectrum), a relatively low total solar transmittance below about 50 percent and a high Illuminant A (blue end and red end of the spectrum) of at least about 70 percent at a 0.25 inch glass thickness, the composition comprising the following ingredients in approximate percent by weight:

| Ingredients | Percent by Weight |
|---|---|
| $SiO_2$ | 60–80 |
| $Na_2O$ | 10–20 |
| $K_2O$ | 0–10 |
| CaO | 5–16 |
| MgO | 0–10 |
| $Al_2O_3$ | 0–5 |
| $TiO_2$ | 0–0.5 |
| $SO_3^-$ | 0–0.5 |
| $Fe_2O_3$ | 0.3–0.86 |
| $SnO_2$ | 0.5–2.0 |
| $P_2O_5$ | 0.01–1 | the composition absorbing infrared rays.

The present invention also provides a method of making an infrared absorbing glass article for use, for example, in motor vehicle windshields, the method comprising the steps of:

A. providing a glass batch composition,
B. melting the batch to provide a glass composition particularly adapted for use as a windshield for a motor vehicle, the composition comprising the following ingredients in approximate percent by weight:

| Ingredients | Percent by Weight |
|---|---|
| $SiO_2$ | 60–80 |
| $Na_2O$ | 10–20 |
| $K_2O$ | 0–10 |
| CaO | 5–16 |
| MgO | 0–10 |
| $Al_2O_3$ | 0–10 |
| $TiO_2$ | 0–0.5 |
| $SO_3^{--}$ | 0–0.5 |
| $Fe_2O_3$ | 0.3–0.86 |
| $SnO_2$ | 0.5–2.0 |
| $P_2O_5$ | 0.01–1 | the composition absorbing infrared rays, and;
C. forming the melted composition into a sheet and fabricating a glass article therefrom.

In the above described glass composition, about 0.3 to 0.4 weight percent $Fe_2O_3$, about 0.5 to 1 weight percent $SnO_2$, and about 0.01 to 0.3 weight percent $P_2O_5$ are preferred. The most preferred range of $P_2O_5$ is about 0.02 to 0.2 weight percent and the optimum amount is about 0.05 to 0.1 weight percent.

DESCRIPTION OF THE PREFERRED EMBODIMENTS

The following examples illustrate the glass composition that is readily formed into a glass article such as an automotive windshield, the composition absorbing infrared rays and having an Illuminant A value of at least about 70 percent.

EXAMPLE I

Raw batch glass compositions were mixed and heated at about 2600° F. to produce glasses in the form of sheets or plates, the raw batches being as follows:

| Raw Batch Glass Compositions - (weight in grams) | | | | |
|---|---|---|---|---|
| | I | II | III | IV |
| Sand | 1000 | 1000 | 1000 | 1000 |
| Dolomite | 244.9 | 252. | 252. | 252. |
| Limestone | 71.8 | 0 | 0 | 0 |
| Aragonite | 0 | 76.67 | 76.67 | 76.67 |
| Soda Ash | 328.73 | 313.33 | 313.33 | 313.33 |
| Gypsum | 7.93 | 0 | 0 | 0 |
| Salt Cake | 0 | 6.0 | 6.0 | 6.0 |
| Rouge | 4.55 | 4.33 | 4.33 | 3.73 |
| $SnO_2$ | 12.17 | 12.13 | 12.13 | 10.4 |
| Seacoal | 1.38 | 1.38 | 1.38 | 1.38 |
| Calcium Phosphate | 2.27 | 2.27 | 27.13 | 2.27 |

The results of spectral tests on the resultant glasses is as follows:

| | Spectral Results (Transmittances) | | |
|---|---|---|---|
| | Illuminant A | Illuminant C | Percent Total Solar |
| I. | 70.6 | 73.8 | 40.2 |
| II. | 70.5 | 73.7 | 39.0 |
| III. | 72.0 | 74.9 | 42.3 |
| IV. | 71.6 | 74.6 | 41.0 |

In the above examples, Glass number II had the following approximate composition:

| Glass II | |
|---|---|
| Components | Percent by Weight |
| $SiO_2$ | 72.51 |
| CaO | 8.56 |
| MgO | 3.97 |
| $Na_2O$ | 13.38 |
| $K_2O$ | 0.005 |
| $SO_3^{--}$ | 0.180 |
| $Fe_2O_3$ | 0.347 |
| $Al_2O_3$ | 0.127 |
| $TiO_2$ | 0.011 |
| $SnO_2$ | 0.880 |
| $P_2O_5$ | 0.021 |
| Total | 99.991 |

Glass number II is a preferred glass of the present invention, having good infrared absorbing properties, a total solar transmittance of about 39 percent, and an Illuminant A transmittance value of about 70.5 percent.

In the glass samples, Glasses I, III, and IV had the following approximate compositions, which are calculated theoretical approximations of the finished glass:

| | Percent by Weight | | |
|---|---|---|---|
| Components | I | III | IV |
| $SiO_2$ | 72.48 | 72.13 | 72.61 |
| CaO | 8.48 | 8.43 | 8.49 |

-continued

| | Percent by Weight | | |
|---|---|---|---|
| Components | I | III | IV |
| MgO | 3.98 | 3.95 | 3.99 |
| $Na_2O$ | 13.40 | 13.32 | 13.42 |
| $K_2O$ | .004 | .004 | .004 |
| $SO_3^{--}$ | .189 | .188 | .188 |
| $Fe_2O_3$ | .385 | .368 | .330 |
| $Al_2O_3$ | .140 | .140 | .140 |
| $TiO_2$ | .012 | .012 | .012 |
| $SnO_2$ | .883 | .875 | .756 |
| $P_2O_5$ | .054 | .645 | .054 |

Usually about 10 to 50 weight percent of the $P_2O_5$ used in the batch is retained in the glass. Preferably about 30 to 35 percent of $P_2O_5$ added to the raw batch is retained in the glass. Usually at the lower levels of the $P_2O_5$ added to the raw batch, higher percentages of $P_2O_5$ are retained in the glass.

A preferred glass composition containing $P_2O_5$ is as follows:

| Ingredients | Percent by Weight |
|---|---|
| $SiO_2$ | 68–74 |
| $Na_2O$ | 11–14 |
| $K_2O$ | 0–1 |
| CaO | 6–13 |
| MgO | 1.5–4 |
| $Al_2O_3$ | 0–3.5 |
| $TiO_2$ | 0–0.5 |
| $SO_3^{--}$ | 0–0.5 |
| $Fe_2O_3$ | 0.3–0.4 |
| $SnO_2$ | 0.5–1.0 |
| $P_2O_5$ | 0.01–0.3 | the glass absorbing infrared rays.

The general range of $Fe_2O_3$ is about 0.3 to 0.6 weight percent and the preferred range of $Fe_2O_3$ is about 0.3 to 0.4 weight percent. Of the iron content reported above, usually no more than about 50 to 65 percent, and preferably about 40 percent of the $Fe_2O_3$ is reduced to FeO.

The glass compositions of the present invention are readily formed into glass articles such as plates of glass and flat glass articles including automotive glass such as motor vehicle windshields, and architectural glass.

We claim:

1. A glass composition comprising the following ingredients in approximate percent by weight:

| Ingredients | Percent by Weight |
|---|---|
| $SiO_2$ | 60–80 |
| $Na_2O$ | 10–20 |
| $K_2O$ | 0–10 |
| CaO | 5–16 |
| MgO | 0–10 |
| $Al_2O_3$ | 0–5 |
| $TiO_2$ | 0–0.5 |
| $SO_3^{--}$ | 0–0.5 |
| $Fe_2O_3$ | 0.3–0.86 |
| $SnO_2$ | 0.5–2.0 |
| $P_2O_5$ | 0.01–1 | the composition absorbing infrared rays.

2. A glass composition as defined in claim 1, in which $Fe_2O_3$ is about 0.3 to 0.4 weight percent, $SnO_2$ is about 0.5 to 1.0 weight percent, and $P_2O_5$ is about 0.01 to 0.3 weight percent.

3. A glass composition as defined in claim 1, in which the $P_2O_5$ is about 0.02 to 0.2 weight percent.

4. A glass composition as defined in claim 1, in which the $P_2O_5$ is about 0.05 to 0.1 weight percent.

5. A glass composition for making a glass article, the composition comprising the following ingredients in approximate percent by weight:

| Ingredients | Percent by Weight |
| --- | --- |
| $SiO_2$ | 68–74 |
| $Na_2O$ | 11–14 |
| $K_2O$ | 0–1 |
| CaO | 6–13 |
| MgO | 1.5–4 |
| $Al_2O_3$ | 0–3.5 |
| $TiO_2$ | 0–0.5 |
| $SO_3^{--}$ | 0–0.5 |
| $Fe_2O_3$ | 0.3–0.4 |
| $SnO_2$ | 0.5–1.0 |
| $P_2O_5$ | 0.01–0.3 | the glass absorbing infrared rays.

6. An article as defined in claim 5, in which the amount of $P_2O_5$ is about 0.2 to 0.8 weight percent.

7. An article as defined in claim 5, in which the amount of $P_2O_5$ is about 0.4 to 0.6 weight percent.

* * * * *